United States Patent [19]

Groody

[11] 4,065,596

[45] Dec. 27, 1977

[54] ARTIST'S BOARD

[76] Inventor: James Groody, 281-1 Windybush Road, R.D. No. 2, New Hope, Pa. 18938

[21] Appl. No.: 679,182

[22] Filed: Apr. 22, 1976

[51] Int. Cl.² .............................................. B32B 7/02
[52] U.S. Cl. ........................................ 428/215; 35/26; 428/246; 428/248; 428/314; 428/339; 428/507; 428/511; 428/532; 428/537
[58] Field of Search ............. 428/215, 332, 339, 50 D, 428/532, 537, 511, 245-250, 212, 213, 218, 310, 314-318, 320, 322, 507, 512-514; 35/26; 206/1.7; 139/426 R

[56] References Cited

U.S. PATENT DOCUMENTS 2,681,527 6/1954 Sundt ............................. 428/255 X
3,589,955 6/1971 Edwards ............................. 156/59

Primary Examiner—Thomas J. Herbert, Jr.
Assistant Examiner—Bruce H. Hess
Attorney, Agent, or Firm—Max R. Millman

[57] ABSTRACT

A laminated artist's board comprised of a rear substantially rigid backer, a front paintable member in the form of a plastic coated paper, cotton duck or linen sheet, and an intermediate flexibly resilient member wherein the range of hardness of the combined front and intermediate members is such that pressure applied on the paintable member with a brush will produce a dent of limited depth that will recover substantially instantaneously so that the artist can retain his techniques and habits of painting on canvas. The board is less expensive than canvas, is easily cropped and is resistant to humidity and/or temperature changes.

4 Claims, 3 Drawing Figures

ARTIST'S BOARD

This invention relates to an artist's board.

Heretofore artists used canvas stretched over a frame or a canvas board for painting with various media, particularly oils and acrylics.

The conventional canvas has the desirable characteristic of flexibility but the disadvantage of expanding and contracting in response to humidity and/or temperature changes. Hence, the canvas does not maintain constant dimensions of the painting to retain the integrity of the image, and will accelerate deterioration thereof.

Canvas boards consist essentially of treated paper or fabric sheets adhered to or laminated upon a rigid backing. Although generally cheaper than conventional canvas, it has several disadvantages. It is too rigid. When it is cropped or cut with the painting thereon, threads are exposed and the painted layer will ultimately separate from the backing. Deterioration of the painting sets in relatively rapidly after it is cut.

The primary object of this invention is to provide an artist's board which retains the flexibility advantage of canvas and the relative low cost advantage of canvas board while overcoming the disadvantages of both.

Another object of the invention is to provide an artist's board comprising a composite of a rear stiffener layer, a front paintable plastic layer and an intermediate resiliently flexible layer in which the combined flexibility of the front and intermediate layers is such that, when a brush with paint is applied to the front layer, the stroke will be cushioned and the brush will glide, but when the brush is removed therefrom the layer will instanteously recover leaving no valleys or wells to interfere with the artist's habits and techniques of working on canvas.

Another object of the invention is to provide an artist's board of the character described which acts like canvas, and not like a hard surface, yet which maintains constant measurements during changes of humidity and/or temperature, which can be cropped or cut by shearing the intermediate resiliently flexible layer thus avoiding exposure of threads or fibers and without altering the painted image, and which resists deterioration.

These and other objects of the invention will become more apparent as the following description proceeds in conjunction with the accompanying drawing, wherein.

Specific reference will now be made to the drawing, wherein similar reference characters are used for corresponding elements throughout.

Figure 1:
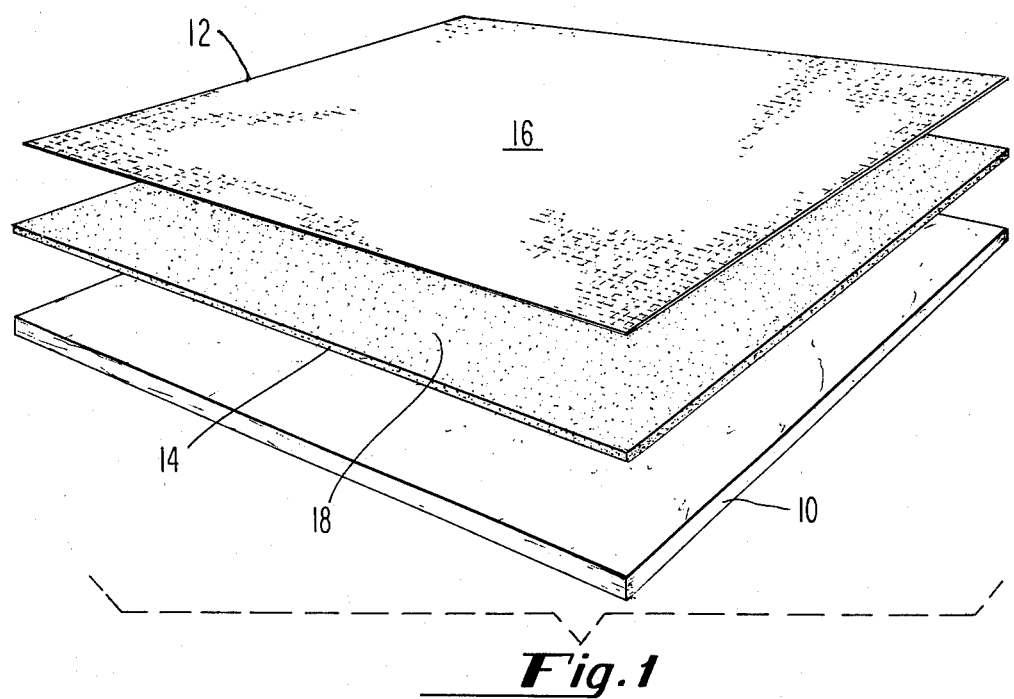
FIG. 1 is a group perspective of the instant invention.
Figure 2:
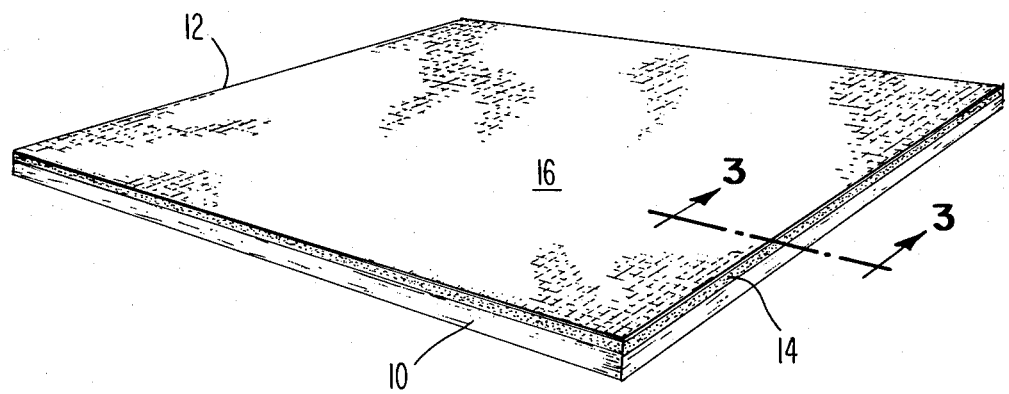
FIG. 2 is a perspective view of the united composite artist's board.
Figure 3:
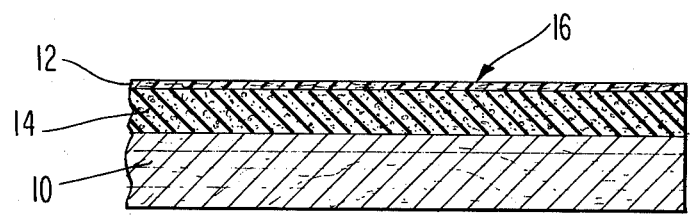
FIG. 3 is an enlarged sectional view thereof taken in the line 3—3 of FIG. 2.

The instant artist's board in final composite form is shown in FIG. 2. It comprises three coextensive members, a rear stiffener member 10, a front paintable member 12 and an intermediate resiliently flexible core member 14, all three members being laminated together with the use of a suitable adhesive between the members 10 and 14 and 12 and 14.

The stiffener member 10 can be made of any suitable substantially rigid and preferably inexpensive material such as wood, particle board, plywood, Masonite (fireboard-plastic) and the like. Thicknesses thereof can vary, but the member must be substantially rigid relative to the other members 10 and 12.

The front member 12 is made of paper, cotton duck or linen treated to provide an outer preferably white or offwhite surface 16 upon which the artist can paint with oil or acrylics so that they will dry by outward evaporation and not by absorption through the member 12. The paper, cotton duck or linen can be coated or impregnated with emulsions of various resins.

The acrylic and vinyl polymer emulsions which can be utilized to impregnate or coat the paper, duck or linen stock are set forth on pages 797, 806 and 807 of Vol. 6 of Encyclopedia of Polymer Science and Technology, Interscience Publishers, New York, N.Y. (1967), which is herein incorporated by reference.

Emulsions of poly (methyl methacrylate), poly (methyl methacrylate-ethyl acrylate) copolymers, poly (vinyl acetate), poly (vinyl chloride), copolymerized vinyl chloride and vinyl acetate, polyvinyl butyral and the like can be used to provide a water resistant coating on the paper, duck or linen stock. The emulsion can be water or turpentine soluble, but the former is preferred since the fibers of the paper, cotton duck or linen stock are least adversely affected when impregnated or coated with an aqueous emulsion and then dried.

Where the emulsion provides a transparent flexible film, it need not be pigmented since the paper stock itself is white. The paintable surface 16 of the front member 12 is then a plastic film through which the white of the paper shows through.

A number of different commercial papers can be employed as the paintable member 12. For example, one may use Canvasette, a product of Bienfang Paper Company, a heavy weight (about 140 pound), white, chemically stabilized ammonia free paper coated with clear polyethylene.

The paper stock can also be extrusion coated with flexible polyethylene and polypropylene resins which form clear, tough glossy films. Suitable polyethylene extrusion coatings have a density (gm/cc) of 0.918–0.950, a melt index (gm/10 min.) of 3.9–6.5, excellent sealability, good to excellent moisture vapor transmission, excellent chemical resistance, excellent low temperature toughness and good adhesion. Suitable polypropylene extrusion coatings have a density (gm/c.c) of 0.905, a melt index (gm/10 min.) of 20.0, good sealability, excellent moisture transmission, excellent chemical resistance, excellent low temperature toughness and fair adhesion.

Another example of a commercial sheet that can be employed as the paintable member 12 is an imitation canvas comprising a vinyl resin containing white pigments extruded with cotton which couples to the resin to form a relatively light weight sheet (about 40–80 pounds), known as Vindalon 90, a product of Morilla Company of New York, N.Y.

Compositions found most suitable for impregnating or coating the paper, cotton duck or linen substrate are aqueous emulsions of poly (methyl methacrylate-ethyl acrylate) copolymer sold by Rohm and Haas of Philadelphia, Pennsylvania under the trademarks Rhoplex AC-33, AC-34 (now AC-234), HA-8 HA-12 and HA-16. The acrylic emulsions Rhoplex AC-33 and AC-34 and their uses are described in Resin Review, Vol. XVI, No. 3 (1966) which is herein incorporated by reference.

As indicated hereinbefore, other acrylic and vinyl resin emulsions may also be used to coat the paper, cotton duck or linen substrates. In the case of duck or linen, a white inorganic pigment, such as aluminum oxide, titanium dioxide and the like, should be incorporated in the acrylic or vinyl emulsion (Gesso coat) so that when the emulsion dries the water resistant plastic coating on the duck or linen is white and thus suitable for the application of acrylic or oil paint thereto by the artist.

The paper, cotton duck or linen substrates can also be coated, by brush, roller or spray, with solvent-less, amine-cured liquid epoxy resins or with thermoplastic high molecular weight epoxy resins (n values in excess of 100) which are inherent film formers by solvent evaporation.

The thickness of the front paintable member 12 can vary. The major consideration is the ability of the paper to be impregnated or coated with the plastic, retain its integrity and be relatively inexpensive. Thicknesses in the area of 1/32 inch to 1/16 inch have been found suitable.

The intermediate layer or core 14 is a sheet of resiliently flexible material. The material can be a vulcanizable rubber, vulcanizates of acrylic elastomers (e.g. ethyl and butyl acrylate elastomers) which have tensile strengths (p.s.i.) of 500–2400, elongation at break (%) of 100–400, Shore A hardness of 40–90 (See Vol. 1, p. 226 et seq. of Encyclopedia of Polymer Science and Technology), or cellular plastics such as foam polyvinyl or polyurethane resins.

The thickness of the flexibly resilient core may vary from about 1/16 inch to ⅜ inch depending upon the desired overall size of the artist's board and is secured to the inner faces of the paintable member 12 and stiffener 10 by suitable adhesives. Where the core is made of polyurethane, a contact cement is used. Where foam polyvinyl, acrylic elastomers or rubber is used, a suitable adhesive is an aqueous emulsion of polyvinyl acetate formulated with a filler of clay or starch, plasticizer and a hydrocolloid such as polyvinyl alcohol or carboxyethylcellulose.

For large board sizes, pattern adhesion should be used, i.e. dots 18 of adhesion placed on both sides of the intermediate flexibly resilient sheet 14 by a rocking pick, to cut down saturation of the adhesive into the sheet 14. Otherwise, both sides of the sheet 14 can be entirely coated with a suitable adhesive. The unit is then assembled in a press, preferably with an upward curl or warp, and allowed to set at room temperature to obtain a flat integrated unit as shown in FIG. 2.

In final assembly, the flexibility should be such that when a force is applied downwardly on the paintable member 12 a maximum depression of about 3/32 inch will be formed which will be recoverable substantially instantaneously. Thus, the upper limit of hardness should be 75±5 Shore A (Durometer) at 10 seconds, the lower limit 70±5, and the preferred hardness 72±5. By providing flexible resilience within this range of hardness, the artist can retain his habits of painting on canvas with cushioned gliding brush strokes and no residual wells between strokes to alter the image.

Among the materials which can be used to provide the intermediate flexibly resilient sheet 14 is styrofoam as well as the other materials hereinbefore described. Styrofoam is desirable as a core because it allows cutting with a knife or razor blade for cropping and removal of the art work from the stiffener, thereby eliminating the need for the use of a saw or special equipment therefor.

Thus, a composite artist's board is provided with dimensional stability with a resiliently flexible paintable surface within hardness limits to provide substantially instantaneous recovery, which can be readily cropped and cut without causing separation or distortion of the image, which is less expensive than canvas, and which allows the artist to retain his brush stroke techniques and habits for painting on canvas.

While preferred embodiments have herein been shown and described, it will be understood that a skilled artisan may make variations without departing from the spirit of the invention.

What is claimed is:

1. A laminated artist's board comprising a rear substantially rigid stiffener member, a front member of fibrous material consisting of paper, cotton duck or linen, said fibrous material having a plastic paintable surface thereon consisting of polyethylene, polypropylene, acrylic, vinyl or epoxy resins and an intermediate flexibly resilient member consisting of rubber, vulcanizates of acrylic elastomers or foamed plastic, the combined hardness of the front and intermediate members being such that the application of a paint brush to the paintable surface will be cushioned and indent the surface but the indentation will recover substantially instantaneously.

2. The artist's board of claim 1 wherein said front and intermediate members have a combined Shore A durometer hardness of about 70±5 to about 75±5 for ten seconds.

3. The artist's board of claim 1 wherein said rear stiffener member is wood, particle board, or fireboard-plastic.

4. The artist's board of claim 1 wherein the thickness of said front member is about 1/32 inch to 1/16 inch and that of said intermediate member is about 1/16 inch to ⅜ inch.

* * * * *